United States Patent
Rao et al.

(10) Patent No.: US 8,170,318 B2
(45) Date of Patent: May 1, 2012

(54) FILTER BANK FOR ULTRASOUND IMAGE ENHANCEMENT

(75) Inventors: Bimba S. Rao, San Jose, CA (US); Ismayil M. Guracar, Redwood City, CA (US); Kutay F. Ustuner, Mountain View, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 399 days.

(21) Appl. No.: 12/479,647

(22) Filed: Jun. 5, 2009

(65) Prior Publication Data
US 2010/0310143 A1 Dec. 9, 2010

(51) Int. Cl.
*G06K 9/00* (2006.01)
(52) U.S. Cl. ........................................ 382/131
(58) Field of Classification Search .................. None
See application file for complete search history.

(56) References Cited

U.S. PATENT DOCUMENTS

| | | | |
|---|---|---|---|
| 6,885,762 B2 | 4/2005 | Saha et al. | |
| 7,004,904 B2 | 2/2006 | Chalana et al. | |
| 7,502,499 B2 | 3/2009 | Grady | |
| 7,512,284 B2 | 3/2009 | Avinash | |
| 7,775,981 B1 * | 8/2010 | Guracar et al. | 600/447 |
| 2007/0014446 A1 | 1/2007 | Sumanaweera et al. | |
| 2007/0236374 A1 * | 10/2007 | Brueske et al. | 341/143 |

* cited by examiner

*Primary Examiner* — Tu Nguyen

(57) ABSTRACT

Image enhancement is provided in ultrasound imaging. A filter bank is used to process the data. The data may be processed in parallel. Each filter outputs data representing a same location, but with a kernel path (e.g., line, curved line, area, curved surface, or volume) different than for the other filters. For example, three filters filter along respective orthogonal planes. The filters may use preselected or data independent paths. The output of the filter bank is determined from the outputs of the filters in the bank, such as by selecting the maximum value. This bank-based filtering may enhance data associated with anatomical surfaces or contours and/or may reduce speckle. The parallel operation of the filters may allow for more rapid processing and/or processing a greater amount of data as compared to using a single filter.

20 Claims, 3 Drawing Sheets

FILTER BANK FOR ULTRASOUND IMAGE ENHANCEMENT

BACKGROUND

The present document relates to ultrasound image enhancement. In particular, filters are used to enhance imaging.

Signal processing for ultrasound image enhancement and visualization typically is performed as a two-dimensional process. Planes are scanned. The resulting data representing the plane is filtered. The data for different planes are then used for two-dimensional imaging or rendering a three-dimensional representation.

Filtering may be applied to volume data. For volume or three-dimensional imaging, the computational complexity significantly increases as compared to filtering along a plane. Extending two-dimensional filtering techniques to three-dimensional filtering and filtering developed exclusively for volume imaging may be prohibitively expensive in terms of computation time, possibly preventing use for real time processing or requiring more expensive hardware.

Minimizing speckle noise is an important component of image enhancement in both two-dimensional and three-dimensional ultrasound imaging. In three-dimensional cardiac imaging, visualization of the surfaces of anatomic structures such as valves, heart walls, and the septum is of importance. Filtering is used to enhance these surfaces while reducing speckle noise. However, the computational expense to filter is high.

BRIEF SUMMARY

By way of introduction, the preferred embodiments described below include methods, systems, filtering, computer readable media, and instructions for image enhancement in ultrasound imaging. A filter bank is used to process the data in parallel. Each filter outputs data representing a same location, but with a kernel path (e.g., line, curved line, area, curved surface, or volume) different from the other filters. For example, three filters filter along respective orthogonal planes. The filters may use preselected or data independent paths. The output of the filter bank is determined from the outputs of the filters in the bank, such as by selecting the maximum value. This bank-based filtering may enhance data associated with anatomical surfaces or contours and/or may reduce speckle. The parallel operation of the filters may allow for more rapid processing and/or processing a greater amount of data as compared to using a single filter.

In one aspect, a system is provided for image enhancement in ultrasound imaging. A first filter is configured to filter along locations in a first path within a plane or volume. The path may be a straight line, a curved line, or a planar surface for filtering in the plane. The path may be a straight line, a curved line, a planar surface, a curved surface, or a volume for filtering in the volume. The first filter is configured to generate a first output for a first location of the locations. A second filter is configured to filter along locations in a second path within the plane or volume. The second path is different from the first path. The second filter is configured to generate a second output for the first location of the locations. A processor is configured to determine a value for the first location of the locations. The value is determined as a function of the first and second outputs from the first and second filters.

In a second aspect, a method for image enhancement is provided in ultrasound imaging. Ultrasound data representing different locations within a patient is received. Surfaces represented by data are enhanced. The enhancing is performed by a bank of filters each operable to filter for each of the different locations, but along different surfaces or contours. An image is generated as a function of data output from the bank of filters.

In a third aspect, a computer readable storage medium has stored therein data representing instructions executable by a programmed processor for image enhancement in ultrasound imaging. The storage medium includes instructions for receiving data representing locations distributed in a volume, filtering the data with a plurality of filters, the filters filtering along different, preselected surfaces or contours regardless of anatomical surfaces or contours in the volume, each filter outputting filtered data for each location of the locations, and determining an output value for each location in the volume as a function of the filtered data for each location output by the filters.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

The coherence and visualization of anatomic structure or surfaces may be enhanced and/or speckle noise may be reduced while processing at high rates. For example, the enhancement and/or speckle reduction may be performed at rates needed for real time full volume imaging. The enhancement and/or reduction may also be performed for two-dimensional imaging.

A filter bank enhances imaging. The bank of filters is used for real time imaging, such as high data rate (e.g., 160 Mbytes/sec or higher) cardiology volume or four-dimensional imaging. The bank includes pre-selected (data independent) contour, surface and/or volume matched filters. In one example, the filters are formed from 1-D boxcar filters operating along different axes. To preserve resolution or enhance edges after filtering, the output for a given location may be determined from data representing other locations. Alternatively, the bank of filters is used in off-line image-processing systems.

Figure 1:
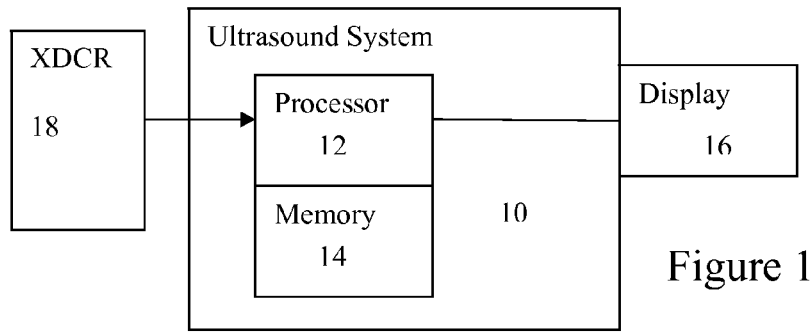
FIG. 1 is a block diagram of one embodiment of a system for image enhancement in ultrasound imaging.

FIG. 1 shows a medical diagnostic imaging system 10 for image enhancement in ultrasound imaging, such as speckle reduction or surface enhancement in three-dimensional medical imaging. The system 10 is a medical diagnostic ultrasound imaging system, but may be a computer, workstation, database, server, or other imaging system. Other medical imaging systems may be used, such as a computed tomography or a magnetic resonance system.

The system 10 includes a processor 12, a memory 14, a display 16, and a transducer 18. Additional, different, or fewer components may be provided. For example, the system 10 includes a transmit beamformer, receive beamformer, B-mode detector, Doppler detector, harmonic response detector, contrast agent detector, scan converter, user input, combinations thereof, or other now known or later developed medical diagnostic ultrasound system components. As another example, the system 10 does not include the transducer 18.

The transducer 18 is a piezoelectric or capacitive device operable to convert between acoustic and electrical energy. The transducer 18 is an array of elements, such as a multi-dimensional or two-dimensional array. Alternatively, the transducer 18 is a wobbler for mechanical scanning in one dimension and electrical scanning in another dimension. Linear or curved linear, 1.25D, 1.5D, or 1.75D, 2D, or other arrays for two-dimensional scanning may be used.

The system 10 uses the transducer 18 to scan a plane, different planes, or a volume. Electrical and/or mechanical steering allows transmission and reception along different scan lines. Any scan pattern may be used. In one embodiment, the transmit beam is wide enough for reception along a plurality of scan lines, such as receiving a group of up to 20 or more receive lines for each transmission. In another embodiment, a plane, collimated or diverging transmit waveform is provided for reception along a plurality, large number, or all scan lines.

Ultrasound data representing a volume or plane is provided in response to the scanning. The ultrasound data is beamformed, detected, and/or scan converted. The data may be obtained using any modality, such as B-mode or flow mode. The ultrasound data may be in any format, such as polar or Cartesian coordinates, Cartesian coordinate with polar coordinate spacing between planes, or other format. In other embodiments, the ultrasound data is acquired by transfer, such as from a removable media or over a network. Other types of medical data representing a volume or plane may also be acquired.

The memory 14 is a buffer, cache, RAM, removable media, hard drive, magnetic, optical, or other now known or later developed memory. The memory 14 may be a single device or group of two or more devices. The memory 14 is shown within the system 10, but may be outside or remote from other components of the system 10.

The memory 14 stores the ultrasound data. For example, the memory 14 stores flow components (e.g., velocity, energy or both) and/or B-mode ultrasound data. The medical image data is a two- or three-dimensional data set, or a sequence of such sets. For example, a sequence of sets over a portion, one, or more heart cycles of the heart are stored. A plurality of sets may be provided, such as associated with imaging a same person, organ or region from different angles or locations. The data represents a plane or volume of a patient, such as representing a portion or all of the heart.

For real-time imaging, the ultrasound data bypasses the memory 14, is temporarily stored in the memory 14, or is loaded from the memory 14. Real-time imaging may allow delay of a fraction of seconds, or even seconds, between acquisition of data and generating of an image. For example, real-time imaging is provided by generating the images substantially simultaneously with the acquisition of the data by scanning. While scanning to acquire a next or subsequent set of data, images are generated for a previous set of data. The imaging occurs during the same imaging session used to acquire the data. The amount of delay between acquisition and imaging for real-time operation may vary, such as a greater delay for initially locating planes of a multi-planar reconstruction with less delay for subsequent imaging. In alternative embodiments, the ultrasound data is stored in the memory 14 from a previous imaging session and used for imaging without concurrent acquisition.

The memory 14 is additionally or alternatively a computer readable storage medium with processing instructions. The memory 14 stores data representing instructions executable by the programmed processor 12 for image enhancement in ultrasound imaging. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 12 is a general processor (e.g., Pentium single instruction multiple data processor), digital signal processor, three-dimensional data processor, graphics processing unit (GPU), application specific integrated circuit, field programmable gate array, digital circuit, analog circuit, filter, splitter, selector, combinations thereof, or other now known or later developed device for processing medical image data. The processor 12 is a single device, a plurality of devices, or a network. For more than one device, parallel or sequential division of processing may be used. Different devices making up the processor 12 may perform different functions, such as a scanning controller and an image generator operating separately. In one embodiment, the processor 12 is a control processor or other processor of a medical diagnostic imaging system, such as a medical diagnostic ultrasound imaging system processor. In another embodiment, the processor 12 is a processor of an imaging review workstation or PACS system. The processor 12 operates pursuant to stored instructions to perform various acts described herein, such as receiving data, filtering, determining outputs, and generating images or three-dimensional representations (i.e., two-dimensional image of a view rendered from volume information).

Figure 2:
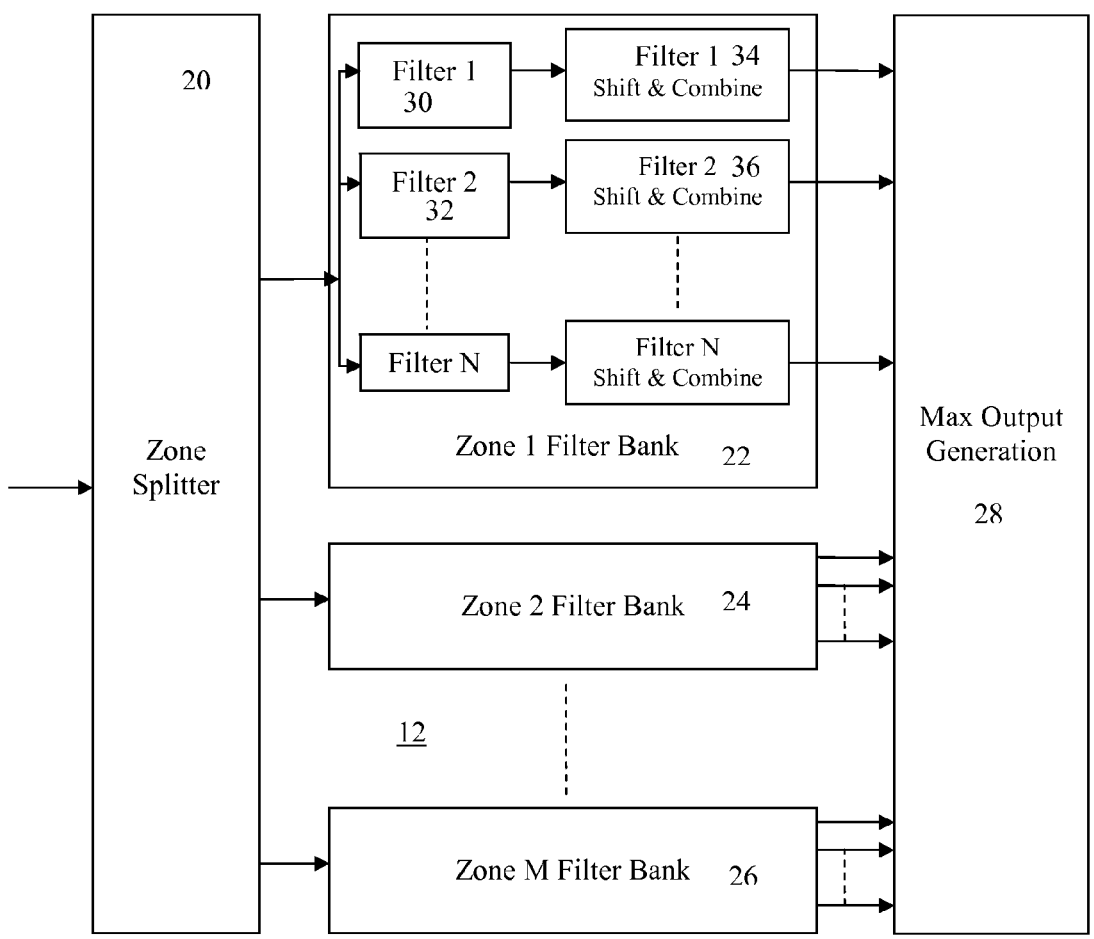
FIG. 2 is a block diagram of an example bank of filters.

FIG. 2 shows one embodiment of the processor 12 implementing a bank of filters. The processor 12 is a general processor or GPU programmed to perform the filtering represented in FIG. 2. In other embodiments, discrete filtering components, application specific integrated circuits, or hardware components as shown in FIG. 2 implement the bank of filters processor 12.

The processor 12 includes a zone splitter 20, filters 30, 32 in banks 22, 24, 26, and an output generator 28. Additional, different, or fewer components may be provided. For example, only one bank 22, 24, or 26 of filters is provided without the zone splitter 20.

Each bank 22, 24, 26 includes the same or different numbers of filters 30, 32. Any number of filters 30, 32 may be used. For example, one bank 22 has three or six filters 30, 32. The filters 30, 32 of a given bank 22, 24, 26 filter for the same location, but with different kernel positions. Different filters 30, 32 filter along different paths. For example, three filters 30, 32 filter along different planes within a volume to determine a filtered value for a given location. The filters 30, 32 generate outputs for the location. The kernels are repositioned to filter for other locations along the respective path. Filtering along different paths in parallel may allow for more rapid filtering and/or filtering of more data as compared to filtering over the same spatial extent with one kernel or filter.

Any paths for the kernels may be used. Path is used to denote spatial difference, but not necessarily a line. A path may be a surface or volume. The paths are different, such as including at least one location and corresponding data value in one path and not in another path. For example, the paths are generally oriented along different directions. In one embodiment, each filter 30, 32 filters along a different plane in a volume. For example, orthogonal planes intersecting at the current location of interest are defined in a volume represented by data. One filter 30 filters along one plane (e.g., XY plane), another filter 32 filters along another plane (e.g., YZ plane), and another filter N filters along the remaining plane (e.g., XZ plane). The filter kernels are positioned on the paths, such as selecting data contributing to the filtered output from only along the respective path (e.g., from just along the plane).

Any type of filter may be used, such as low pass, high pass, or band pass filters. In one embodiment, boxcar filters are used. A boxcar filter has equal coefficients for each tap, so may not use multipliers. A boxcar filter may be easily scaled since the same amount of data is read in and read out of an accumulator regardless of the size of the accumulator. Gaussian or other filters may alternatively be used. The filter is a finite-impulse-response filter, but infinite impulse response filtering may be used.

Any size kernel may be used. For example, each dimension of the kernel extends from three to nine locations (e.g., 7, 3×3, 3×9, 5×6, or 4×4×4). The kernel size may be preselected, set, programmable, or adaptive. For example, the kernel size may vary with different zones, such as a smaller kernel size for the near field locations and a larger kernel size for far field locations. In one embodiment, the kernel size is determined based on the imaging application and/or expected data rate. Smaller kernels may provide for more rapid processing. Using preselected or set filters rather may avoid processing associated with first identifying a surface along which to filter. The number of filters may likewise be set, programmable, preselected, or adaptive.

The filters 30, 32 enhance values associated with an anatomical structure. By low pass filtering, the filters 30, 32 adjust a value for a given location to be more similar to surrounding values. Where the surrounding values are high due to representation of an anatomical boundary, the filtering enhances the values for the anatomical boundary and reduces high frequency speckle. Where the surrounding values are low due to lack of representation of an anatomical boundary or surface, the filtering reduces high frequency speckle and does not enhance the values for anatomical structure.

By using preselected or programmed path locations or orientations, only anatomical surfaces generally along the filtering path are enhanced. By providing a greater number of filters or more complex kernel paths, anatomical surfaces are enhanced at more orientations and/or positions. Preselected or fixed path locations avoid processing associated with first identifying the anatomical surface and then filtering along the identified surface.

Any type of path may be used to enhance anatomical surfaces. In one embodiment, surface filters with kernels extending over at least two dimensions are used. The path defined by the kernel for each filter is planar or curved surface. In the orthogonal plane example, three planar surface filters are used. Three-dimensional surface filters may be provided, such as a kernel representing a curved surface.

In another embodiment, contour filters with kernels extending over at least one dimension are used. The path defined by the kernel for each filter is a straight line or curved line. For example, the kernels of three contour filters extend along orthogonal lines of the primary dimensions (e.g., x, y, and z-axes). As another example, the kernels of six or twelve contour filters extend along lines in different directions.

In another embodiment, volume filters with kernels modeling anatomic structure or extending over three-dimensions are used. The volume filters may correspond to a "thick" line or surface. The path is filled, such as a solid ellipsoid, or hollow. The shape defined by the path may model specific anatomical structure with any level of resolution. For example, the kernel has a general ellipsoid shape to model a heart chamber or the whole heart. As another example, the kernel has a shape modeled specifically from the typical structure, including one or more valve locations for modeling the heart. Different filters may be used for filtering the same shape, but at different scales and/or orientations.

The filters 30, 32 are non-separable or separable. Non-separable filters are contour, surface, or volume filters implemented with a single filter or kernel. Separable filters may be implemented from multiple cascaded or parallel filters. For example, a planar surface filter is implemented as two cascaded one-dimensional filters. In the orthogonal plane example, each surface filter may be formed from cascaded one-dimensional boxcar filters. Each one-dimensional filter filters along a different direction or line, such as one along X and another along Y for the XY plane. Separable filters may be simpler and operate faster than non-separable filters, but may require more filters to achieve a same match with the anatomical structure represented by data. Filters 30, 32 with a path modeling expected anatomical structures may be non-separable depending on the level of complexity of the model.

The paths may be preset, programmed, or selected free of identification of anatomical structure from the data to be filtered. Rather than identifying a surface represented by data and filtering along the surface, the data is filtered using paths set without identification of the anatomical surface in a given or specific data set. If the surface generally aligns with the preset path, then the data is enhanced relative to the surface.

The output from each filter 30, 32 in the bank 22, 24, 26 represents the response of the data for the path. For example, the data generally represents a surface extending along the XY plane for a portion of the volume. For that portion, the data will be smoothed. Where a surface is along the path or kernel, the smoothing will result in a higher intensity, showing the surface. For other portions of the path in XY, the data may be smoothed, but to a lower intensity. Similar smoothing occurs for data along other paths. In the orthogonal plane example, the bank 22, 24, 26 outputs data for a same location, each output representing the surface level (i.e., intensity) along a different path for that location.

Optimal performance may be achieved by selection of a minimum set of appropriate filters 30, 32 for a given imaging application. Depending on the desired level of enhancement, fewer filters may be used. The filters are implemented using a three dimensional convolution equation:

$$\text{Output}(x, y, z) = \sum_{x'} \sum_{y'} \sum_{z'} \text{Input}(x', y', z') * \text{Filter}(x - x', y - y', z - z') \quad (1)$$

where the output is a combination of the outputs of the filters of the bank. The data is separately passed through each filter 30, 32 in the filter bank 22, 24, 26 to convolve the three-dimensional output. The z term may be removed for two-dimensional operation.

The kernels move to different locations to filter the data at each of the different locations. Each filter 30, 32 is configured to filter for a plurality of locations. For example, data for one tap is replaced with other data, corresponding to shifting a kernel by one position on the path. An output is generated for each location.

Figure 3:
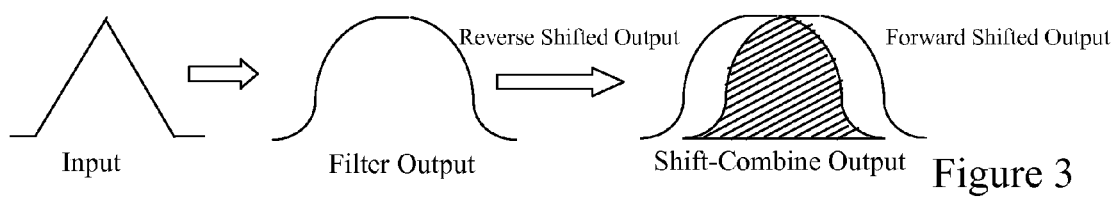
FIG. 3 is a graphical representation of edge enhancement according to one embodiment.

In one embodiment, the filtered data may be further processed to contract or better define edges. Low pass filtering tends to blur edges. Filtered data from one or more nearby locations may be used to better define an edge, reducing the blurring effect of filtering. The shift and combiners 34, 36, operate on the outputs of the filters 30, 32 to better define any edges. FIG. 3 represents the process. Input data may be sharp, as represented by the peaked pyramid. The filtering smoothes the peak, as represented by the filtered output. By shifting the filter forward and/or backward in a one-dimensional or contour filter, a sharper output may be formed by combination. Shifting other dimensions may be used. The 'shift and combine' operation provides sharpening of structure edges that are blurred due to filtering.

Figure 4:
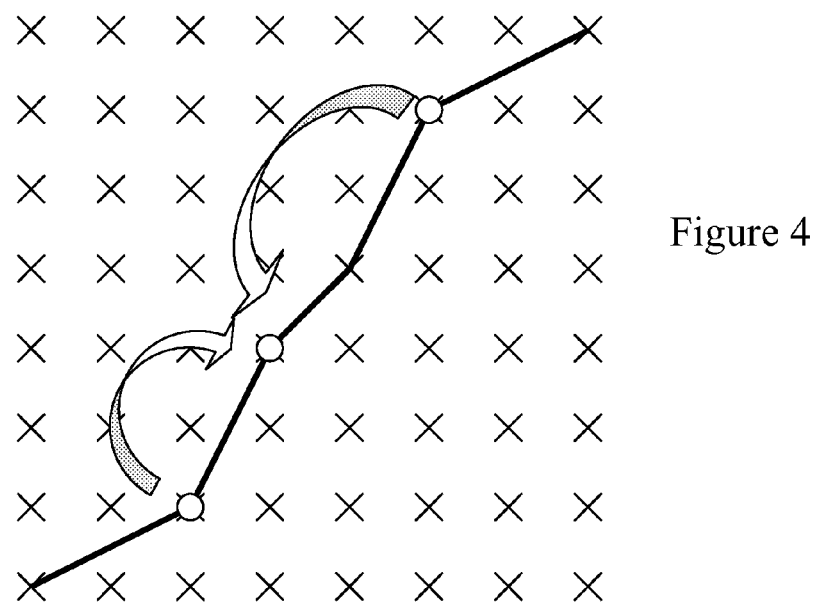
FIG. 4 is a graphical representation of edge enhancement along a contour.

The shift corresponds to review of filtered data output for nearby locations. Nearby may be adjacent locations or may be locations not adjacent, such as spaced at two or more locations from the location being considered. Filtered output for any number of other locations may be considered. For example, two nearby locations, three total including the output for the current location, are used for a contour filter. FIG. 4 shows locations represented by X in a plane with a contour for filtering along the bold line. The center circle represents the location being filtered. The outer two circles represent filtered output from other locations. The arrows indicate consideration of these nearby outputs for determining the value of the output to be used at the current location.

Figure 5:
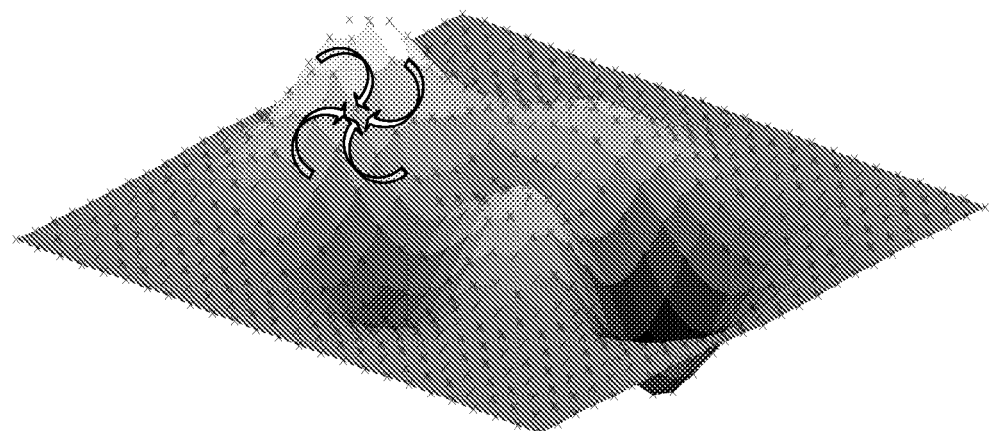
FIG. 5 is a graphical representation of edge enhancement along a curved surface.

In another example, four nearby locations, five locations including the output from the current location, are considered for a surface filter. FIG. 5 represents this example. A greater number or fewer number of nearby locations may be used. The shift and combine operation may be implemented after separable surface or volume filters following each component line filter. Two cascaded shift-combine operations are performed along different line dimensions. Alternatively, one surface shift-combine operation, such as represented in FIG. 5, may be used.

By shifting along the path, the shift corresponds to data at different locations. The kernel shifts along the path, such as by shifting the data loaded into the taps of the filter. As shown in FIG. 2, the shift and combiners 34, 36 are located after the respective filters 30, 32. The shift and combiners 34, 36 may include a buffer or memory to load the data for the desired locations. The shift and combiners 34, 36 may be provided at other locations, such as one shift and combiner provided after the output generator 28.

The "combine" operation corresponds to selecting a minimum value. The minimum of both outputs and optionally the input (i.e., output for the current location) is selected. Other combination functions may be used, such as a weighted average. The shift and combiner operation along a contour is represented by:

$$\text{ShiftCombineOut}(x, y, z) = \min\{\text{Input}(x, y, z), \text{Out}F(x, y, z), \text{Out}R(x.y.z)\} \quad (2)$$

where OutF is the filtered output shifted forward along the filter, and OutR is the filtered output shifted reverse along the filter. In the surface example, the value of the output for a filter corresponding to the surface is set to the minimum of the filtered output for the current location and four corner locations around the current location along the surface. The center or current location is optionally included in the selection of the minimum.

The output generator 28 determines a value for each of the filtered locations. The value is determined from the filter outputs for the current location. The filter outputs may be with or without edge enhancement. The filters 30, 32 of a given bank 22 output for the same locations, but with filtering along different paths. Where a surface is associated with the path, the filter output may have a higher value. Where a surface is not associated with the path, the filter output may have a lower value. If any of the filtered outputs are higher values, then the location corresponds to an anatomical surface or structure along at least one path. Accordingly, the final output or value should likewise indicate a surface or structure. The output generator 28 determines the value by selecting a maximum of the component outputs. Other combination functions may be used, such as an average or a weighted average.

The outputs of all or a subset of the component filters are combined to generate the final value for each current location. Values are determined for different locations in a plane or volume. The kernels of the various filters 30, 32 in a bank 22 of filters 30, 32 are shifted to filter for different locations. By selecting the maximum filtered output, any surface along one of the paths at the kernel location remains represented while reducing speckle. The value for one location may be a function of filter outputs for the current location. Alternatively, the value is a function of the current and other locations where the edge enhancement is provided. For example, the value is determined as a maximum of outputs from different filters where the outputs for the different filters are determined as minimums for the current and other locations.

The filtering may be performed in parallel, such as filtering along different paths being performed on the data for a given location at a same time. Further parallel processing may be used by filtering with separable surface, contour, or volume filters. Sequential filtering may be used.

Another option for parallel processing is zone operation. Different filter banks 22, 24, 26 operate on different data, such as different sub-sets of a full data set. For example, different banks 22, 24, 26 receive data for different quadrants, depths, segments, or other divisions of data representing a volume. The input data for a given bank may overlap with data for another bank for filtering.

Referring to FIG. 1, the display 16 is a CRT, LCD, plasma, monitor, projector, printer, or other now known or later developed display device. The display 16 displays an image generated from the values output by the processor 12. The image is a two-dimensional image representing a plane or volume. Due to the filtering, speckle in the image may be reduced, and surfaces may be enhanced. Any three-dimensional rendering may be used, such as maximum intensity projection, alpha blending, or surface rendering. A sequence of images may be displayed in real time, such as in four-dimensional imaging with representations displayed at an acquisition speed.

Figure 6:
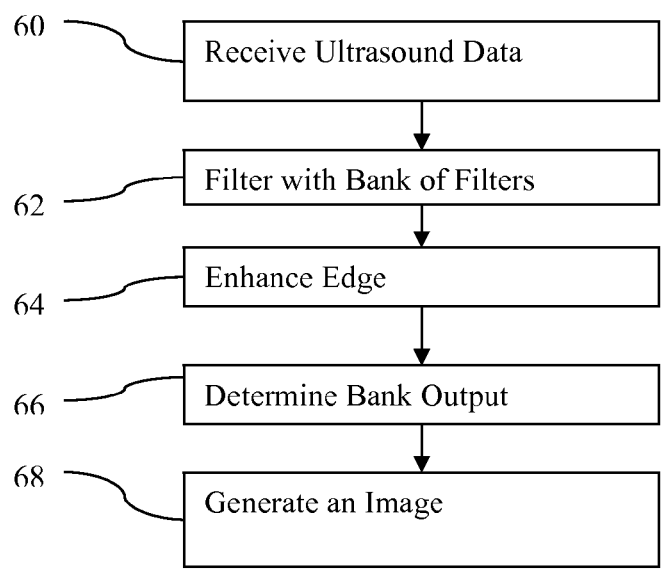
FIG. 6 is a flow chart diagram of one embodiment of a method for image enhancement in ultrasound imaging.

FIG. 6 shows a method for image enhancement in ultrasound imaging. The method is implemented by a medical diagnostic imaging system, a review station, a workstation, a computer, a PACS station, a server, combinations thereof, or other device for image processing medical ultrasound or other types of medical imaging data representing a patient. For example, the system 10, computer readable media 14 and/or processor 12 shown in FIG. 1 or FIG. 2 implements the method, but other systems may be used. The method is implemented in the order shown or a different order, such as performing act 64 after act 66. Additional, different, or fewer acts may be performed. For example, act 64 is optional. As another example, scanning is performed to acquire the data received in act 60.

The acts 60-68 are performed in real-time, such as during scanning. The user may view images while scanning. The images may be associated with previous performance of acts 60-68 in the same imaging session, but with different volume data. For example, acts 60-68 are performed for an initial scan. Acts 60-68 are performed for subsequent scans during the same imaging session. For real-time imaging, the volume or scan plane data used for any given rendering or image may be replaced with more recently acquired data. For example, an initial rendering is performed with one set of data. The final rendering is performed with another set of data representing the same or similar (e.g., due to transducer or patient movement) volume.

In act 60, ultrasound data is received. For scanning, an ultrasound transducer is positioned adjacent, on, or within a patient. For example, a volume scanning transducer is positioned, such as a mechanical wobbler or multi-dimensional array. For adjacent or on a patient, the transducer is positioned directly on the skin or acoustically coupled to the skin of the patient. For within the patient, an intraoperative, intercavity, catheter, transesophageal, or other transducer positionable within the patient is used to scan from within the patient.

The user may manually position the transducer, such as using a handheld probe or manipulating steering wires. Alternatively, a robotic or mechanical mechanism positions the transducer.

The two-dimensional or volume region of the patient is scanned, such as scanning an entire heart or portion of the heart from the esophagus or through another acoustic window. Other organs or parts of a patient may be scanned. The array generates acoustic energy and receives responsive echoes. In alternative embodiments, a one-dimensional array is manually moved for scanning a volume.

One or more sets of data are obtained. The ultrasound data corresponds to a displayed image (e.g., detected and scan converted ultrasound data), beamformed data, detected data, and/or scan converted data. The ultrasound data represents a region of a patient. Data for multiple planar slices may represent the volume region. Alternatively, a volume scan is used. In other embodiments, a planar scan is used. The scanned region includes tissue, fluid or other structures of a patient. Different structures or types of structures react to the ultrasound differently. For example, heart muscle tissue moves, but slowly as compared to fluid. The temporal reaction may result in different velocity or flow data. The shape of a structure or spatial aspect may be reflected in B-mode data. One or more anatomical objects, such as the heart, an organ, a vessel, fluid chamber, clot, lesion, muscle, and/or tissue are within the region. The data represents the region.

The data is received for filtering by a filter bank. The received data represents different locations within the patient. The locations are spaced along a three-dimensional grid, such as a regularly spaced Cartesian coordinate grid, along an irregular grid, or along an acquisition grid, such as a polar coordinate grid. Different data values represent the ultrasound response at different locations and/or times. For a given time or time range, a set of data represents all locations in a scan region. The data may include speckle information.

In act 62, surfaces represented by data are enhanced and/or speckle is reduced. The enhancing is performed by a bank of filters. Each filter in the bank filters data for each of the different locations. The filters of the bank output filtered data for each of the locations. The filters filter along different surfaces, volumes, or contours (i.e., paths), so the filtered data for a given location is the same or different depending on the input data for other locations. By filtering with a plurality of filters along different, preselected surfaces, contours, or volumes regardless of a location of anatomical surfaces or contours in the volume, rapid filtering may be provided. The plurality of filters in the bank allow enhancement of any surfaces or structures without specific identification of the anatomic surface represented by the data or without the identification of the location of the anatomic structure.

Any filtering may be used, such as boxcar filters. With greater processing power available, more complex filters with unequal coefficients may be used. In one embodiment, separable surface filters are implemented as 1-D boxcar filters configured to filter along different axes. For example, three surface filters filter along respective orthogonal planes. Each surface filter is implemented with cascaded 1-D boxcar filters filtering along perpendicular axes in the respective plane.

Each filter in the same bank of filters outputs filtered data for the same locations. The kernels of the filters are centered over different locations. Due to the difference in kernels or paths, the filtered data for a given location may have different values. The kernels are shifted by loading different data into the filter taps. Filtered data is output for each location by the filters of the bank.

In act 64, edges represented by the data may be enhanced. Filtered data from adjacent and/or other nearby locations are used for edge enhancement. Where all the values are higher or lower, an edge does not exist. Where some of the nearby values are higher and some are lower, the location may be at or near an edge. To better define an edge, a selection or combination function is used. For example, the minimum function is used. By selecting the minimum, the edge is contracted until all the values in the neighborhood are high. This shrinkage or contraction better defines the edge. As another example, a majority function is used. The value is set to be an average of the higher values when there are more of the higher values in the neighborhood and the average of the lower values when there are more of the lower values in the neighborhood. Selecting the minimum, median, average of the majority, or other functions act as a combination of filtered data for a neighborhood of locations, including or not including the filtered data of the current location.

The selected value is output as the value for the filter of the filter bank. For each of the filters in the bank, a value is selected from filtered data output by the respective filter.

In act 66, an output value is determined. The filtered data output from the different filters of the bank of filters is combined. For each location, an output value is determined. Any combination function may be used, such as selecting a maximum value. The function provides the desired enhancement.

By filtering along different paths, the output of different filters is responsive to any anatomical surface represented by the data extending along or close to the path. The output of any filter with a path similar to anatomical structure represented by the data has a higher value. Selection of the maximum preserves the values associated with anatomy, enhancing the surface.

In act 68, an image is generated as a function of the data output from the bank of filters. Output values are determined for each location in act 66. The output values may be further processed, such as filtered, scan converted, interpolated, or mapped. For two-dimensional imaging, the output values representing the field of view or image region are formatted in a Cartesian coordinate grid or display format and mapped to grey scale or color values. An image is generated from the mapped values. For three-dimensional imaging, the output values are used for rendering a three-dimensional representation. For example, the output values are interpolated to a regular three-dimensional grid, and a projection image is created.

The images have enhanced surfaces as compared to images generated without the filtering. The surfaces are more likely visible. By using a bank of filters, more rapid filtering is provided. The bank of filters may allow for real-time four-dimensional imaging.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A system for image enhancement in ultrasound imaging, the system comprising:
    a first filter configured to filter along locations in a first path within a plane or volume, the first filter configured to generate a first output for a first location of the locations;
    a second filter configured to filter along locations in a second path within the plane or volume, the second path different than the first path, the second filter configured to generate a second output for the first location of the locations; and
    a processor configured to determine a value for the first location of the locations, the value determined as a function of the first and second outputs from the first and second filters.

2. The system of claim 1 wherein the first and second filters are configured to filter data along different directions.

3. The system of claim 1 wherein the first and second filters comprise surface filters having kernels extending over at least two dimensions, the first and second paths comprising surfaces.

4. The system of claim 1 wherein the first and second filters comprise contour filters having kernels extending over at least one dimension, the first and second paths comprising lines.

5. The system of claim 1 wherein the first and second filters comprise non-separable filters having kernels modeling anatomic structure.

6. The system of claim 1 wherein the first and second filters comprise separable filters having kernels along the first and second paths, the first and second paths set free of an identified anatomical surface or structure.

7. The system of claim 1 wherein the first and second paths comprise first and second surfaces within the volume;
    further comprising a third filter configured to filter along locations in a third path within the volume, the third filter configured to generate a third output for the first location of the locations;
    wherein the processor is configured to determine the value for the first location of the locations as a function of the first, second, and third outputs from the first, second, and third filters.

8. The system of claim 7 wherein the first, second, and third paths comprise orthogonal planar surfaces intersecting at the first location of the locations, the first, second, and third filters configured to filter along respective orthogonal planar surfaces, and the first, second and third outputs representing a surface response along the orthogonal planar surfaces.

9. The system of claim 8 wherein the first, second and third filters each comprise two one-dimensional box-car filters, each of the two one-dimensional box-car filters configured to filter along different directions within the corresponding planar surface.

10. The system of claim 1 wherein the processor is configured to determine the value by selecting a maximum of the first and second outputs.

11. The system of claim 1 wherein the first and second filters are part of a first filter bank;
    further comprising a second filter bank having a plurality of filters, the first and second filter banks configured to filter different sub-sets of data representing different parts of the volume.

12. The system of claim 1 wherein the first and second filters are each configured to filter for second and third locations of the locations; and
    wherein the processor is configured to determine the value as a function of the first and second outputs for the first, second, and third locations of the locations.

13. The system of claim 12 wherein the processor is operable to determine the value as a maximum of minimums of the first outputs for the first, second, and third locations and of the second outputs for the first, second, and third locations.

14. A method for image enhancement in ultrasound imaging, the method comprising:
    receiving ultrasound data representing different locations within a patient;
    enhancing surfaces represented by data, the enhancing being performed by a bank of filters each operable to filter for each of the different locations, but along different surfaces or contours; and
    generating an image as a function of data output from the bank of filters.

15. The method of claim 14 further comprising:
    selecting a maximum of outputs from the filters of the bank for each location.

16. The method of claim 14 wherein enhancing comprises filtering with the filters of the bank being 1-D boxcar filters configured to filter along different axes.

17. The method of claim 14 further comprising:
    for each location, selecting from filtered data for the location and other locations, the selected data being the data output.

18. In a non-transitory computer readable storage medium having stored therein data representing instructions executable by a programmed processor for image enhancement in ultrasound imaging, the storage medium comprising instructions for:
    receiving data representing locations distributed in a volume;
    filtering the data with a plurality of filters, the filters filtering along different, preselected surfaces or contours within the volume regardless of anatomical surfaces or contours in the volume, each filter outputting filtered data for each location of the locations; and determining an output value for each location in the volume as a function of the filtered data for each location output by the filters.

19. The non-transitory computer readable storage medium of claim 18 wherein filtering comprises filtering along different planes with pairs of one-dimensional boxcar filters.

20. The non-transitory computer readable storage medium of claim 18 further comprising selecting the filtered data output by each of the filters for a first of the locations as a function of filtered data for the first location and additional locations.

* * * * *